US012791755B2

(12) United States Patent
Frambati

(10) Patent No.: US 12,791,755 B2
(45) Date of Patent: Nov. 10, 2026

(54) DEFORMING WELL TRAJECTORIES

(71) Applicant: TOTALENERGIES ONETECH, Courbevoie (FR)

(72) Inventor: Stefano Frambati, Pau (FR)

(73) Assignee: TOTALENERGIES ONETECH, Courbevoie (FR)

( * ) Notice: Subject to any disclaimer, the term of this patent is extended or adjusted under 35 U.S.C. 154(b) by 1144 days.

(21) Appl. No.: 17/627,556

(22) PCT Filed: Jul. 18, 2019

(86) PCT No.: PCT/IB2019/000859

§ 371 (c)(1),
(2) Date: Jan. 14, 2022

(87) PCT Pub. No.: WO2021/009533

PCT Pub. Date: Jan. 21, 2021

(65) Prior Publication Data

US 2022/0259959 A1 Aug. 18, 2022

(51) Int. Cl.
*E21B 43/16* (2006.01)
*G01V 20/00* (2024.01)
*G06V 10/75* (2022.01)

(52) U.S. Cl.
CPC .............. *G01V 20/00* (2024.01); *E21B 43/16* (2013.01); *E21B 2200/20* (2020.05); *G06V 10/754* (2022.01)

(58) Field of Classification Search
CPC ..... G01V 20/00; E21B 43/16; E21B 2200/20; G06V 10/754
See application file for complete search history.

(56) References Cited

U.S. PATENT DOCUMENTS 7,043,413 B2 5/2006 Ward et al.
7,260,508 B2 8/2007 Lim et al.
(Continued)

FOREIGN PATENT DOCUMENTS

CN 105089582 B 11/2015
EP 2954159 A1 12/2016
(Continued)

OTHER PUBLICATIONS

Hendrickx et al Trajectory convergence from coordinate-wise decrease of quadratic energy functions, and applications to platoons, Mar. 2019 (Year: 2019).*
(Continued)

*Primary Examiner* — Ryan F Pitaro
*Assistant Examiner* — Adrian Stoica
(74) *Attorney, Agent, or Firm* — Hamilton, Brook, Smith & Reynolds, P.C.

(57) ABSTRACT

Embodiments relate to computer-implemented methods comprising providing a geomodel representing horizons and geological units of a reservoir; providing, for each well a trajectory representing the path of the well in the reservoir, and data distributed along the trajectory. The data include horizon markers, one or more fault markers, and a geological unit log. The method comprises deforming the trajectory of at least one well based on the geomodel. The deforming is constrained by consistency of the horizon markers and of the geological unit log with the geomodel, a discontinuity being allowed at each fault marker. This provides a solution for obtaining consistency between the geomodel and the trajectory of the at least one well.

19 Claims, 3 Drawing Sheets

(56) References Cited

U.S. PATENT DOCUMENTS

| | | | | |
|---|---|---|---|---|
| 8,751,208 | B2 | 6/2014 | Brouwer et al. | |
| 8,812,334 | B2 | 8/2014 | Givens et al. | |
| 9,593,558 | B2 | 3/2017 | Sequeira, Jr. et al. | |
| 9,703,006 | B2 | 7/2017 | Stern et al. | |
| 9,765,571 | B2 | 9/2017 | Huang | |
| 2008/0289877 | A1 * | 11/2008 | Nikolakis-Mouchas | E21B 7/04 702/9 |
| 2010/0282508 | A1 * | 11/2010 | Johnston | E21B 44/00 175/45 |
| 2011/0153300 | A1 | 6/2011 | Holl et al. | |
| 2012/0037359 | A1 | 2/2012 | Schottle et al. | |
| 2013/0140037 | A1 | 6/2013 | Sequeira, Jr. et al. | |
| 2015/0047903 | A1 * | 2/2015 | Gramstad | E21B 49/00 702/14 |
| 2016/0180582 | A1 | 6/2016 | Forge et al. | |
| 2021/0247543 | A1 * | 8/2021 | Frank | G01V 1/282 |

FOREIGN PATENT DOCUMENTS

| | | | | |
|---|---|---|---|---|
| FR | 2961331 | B1 | 12/2011 | |
| WO | 2004095259 | A1 | 11/2004 | |
| WO | WO-2012052786 | A2 * | 4/2012 | G01V 99/00 |
| WO | 2014123640 | A1 | 8/2014 | |
| WO | 2015103218 | A9 | 7/2015 | |
| WO | 2015103229 | A1 | 7/2015 | |
| WO | 2017132098 | A1 | 8/2017 | |

OTHER PUBLICATIONS

Sorkine O et al, As-rigid-as-possible surface modeling, SGP '07: Proceedings of the fifth Eurographics symposium on Geometry processing, p. 109 â 116, Jul. 4, 2007 (Year: 2007).*

Codas et al, Multiple shooting applied to robust reservoir control optimization including output constraints on coherent risk measure, 2017 (Year: 2017).*

Hendrickx et al Trajectory convergence from coordinate-wise decrease of quadratic energy functions, and applications to platoons, 2019 (Year: 2019).*

Sorkine et al (Laplacian Surface Editing, Eurographics,/ACM SIGGRAPH 2004 (Year: 2004).*

Sorkine et al, As-rigid-as-possible surface modeling, SGP '07: Proceedings of the fifth Eurographics symposium on Geometry processing, p. 109 â 116, Jul. 4, 2007 (Year: 2007).*

WO 2012052786 A2 Sutter (Year: 2012).*

Notification of Transmittal of The International Search Report and The Written Opinion of the International Searching Authority for PCT Application No. PCT/IB2019/000859, "Deforming Well Trajectories," mailed Apr. 17, 2020.

Sorkine, O., et al., "Laplacian Surface Editing," Proceedings of the 2004 Eurographics/ACM SIGGRAPH Symposium on Geometry Processing, ACM (2004).

Voglis, C. and Lagaris, I.E., "BOXCQP: An Algorithm for Bound Constrained Convex Quadratic Problems," 1st International Conference "From Scientific Computing to Computational Engineering (1st IC-SCCE)," Athens, Sep. 8-10, 2004.

* cited by examiner

DEFORMING WELL TRAJECTORIES

This application is the U.S. National Stage of International Application No. PCT/IB2019/000859, filed Jul. 18, 2019, which designates the U.S., published in English. The entire teachings of the above application are incorporated herein by reference.

FIELD OF THE INVENTION

The invention relates to the field of geological simulation, and more particularly to computer-implemented methods and products which relate to hydrocarbon flow simulation in a petroleum reservoir having one or more wells (or wellbores), based on a geomodel and on a trajectory of at least one well.

BACKGROUND

Geological simulation refers to all techniques for performing computer simulations related to a geological environment. These techniques assist actors by providing them with computerized representations of real, estimated or predicted states and/or processes related to the geological environment. For example, in the context of hydrocarbon production, hydrocarbon flow simulation (which may simply be referred to as "flow simulation") may provide useful information as to how hydrocarbons (i.e. gas and/or oil) flow in a petroleum reservoir. Flow simulation may for example represent real, estimated or predicted flow paths, flow rates, flowing compositions, and/or evolutions of these quantities over time.

In many existing solutions, a flow simulation is performed based on a geomodel which represents geological structures of a geological environment forming a petroleum reservoir, such as horizons, fault surfaces, channels, and/or any geological unit. Geomodels may optionally comprise geological simulation grids. Geological simulation grids comprise a geometrical grid which represents the geological environment. The geometrical grid may conform to shapes of the geological structures. For example, horizons may correspond to layer structures of the geometrical grid and fault surfaces may correspond to stair-stepped structures of the geometrical grid. Geological simulation grids may further comprise parameters which represent geological properties of the geological structures, such as flow parameters, and which are assigned to geometrical structures of the geometrical grid. A geological simulation grid may be inputted to a flow simulator which performs the flow simulation, according to the shapes of the geometrical grid and/or to the values of the geological properties conveyed by the parameters. Alternatively or additionally to geological simulation grids having geometrical grids, geomodels may optionally comprise any other geometrical representations of the geological environment, such as a representation via surfaces. Geological simulation grids may be determined based on said other geometrical representations if needed.

The flow simulation may be performed further based on a trajectory representing the path of at least one well formed in the reservoir, and optionally further based on data distributed along the trajectory. For example, characteristics of the well may be used to simulate flow in the reservoir during hydrocarbon production. Also, measurements performed along a well may be used as constraints in order to configure the geomodel.

The trajectory of the well may be inconsistent with the geomodel. In other words, the trajectory may represent a path of the well located in space at a position inconsistent with the position where the geomodel locates geological structures. This is for example because of uncertainty and/or approximation in positioning the well and/or the geological structures. As a result, data related to the well may be associated in the simulation to incorrect parts of the geomodel. For example, in the case of measurements performed along the well and used as constraints, the constraints may be positioned inaccurately in the geomodel. In such a case, the properties generated around the wells during the simulation may be inaccurate.

Existing methods for obtaining consistency between well trajectories and a geomodel often include deforming the geomodel (e.g. geometrical grid of the geomodel), so as to adjust the geomodel on the wells. This is the solution proposed for example by document US 20160180582 A1. However, these methods perform poorly or even cannot perform in certain configurations, for example when the geomodel does not contain subtle and uncertain details of the subsoil, such as sub-seismic faults or layer thickness variations that cannot be mapped.

There is thus a need for an improved solution for obtaining consistency between, on the one hand, a geomodel configured for hydrocarbon flow simulation in a petroleum reservoir and having one or more wells, and, on the other hand, well trajectories.

SUMMARY OF THE INVENTION

It is therefore provided a computer-implemented method. The method comprises providing a geomodel configured for hydrocarbon flow simulation in a petroleum reservoir having one or more wells. The geomodel represents horizons and geological units of the reservoir. The method comprises providing, for each well, a trajectory representing the path of the well in the reservoir, and data distributed along the trajectory. The data distributed along the trajectory include horizon markers, one or more fault markers, and a geological unit log. The method comprises deforming the trajectory of at least one well based on the geomodel. The deforming is constrained by consistency of the horizon markers and of the geological unit log with the geomodel. A discontinuity is allowed at each fault marker.

In examples, the method may comprise one or more of the following:

- the method rewards rigidness of the deforming;
- the horizons are generally orthogonal to a same direction, the deforming comprising applying, to positions of the trajectory, a displacement restricted to said direction, the direction being for example a vertical direction;
- the deforming comprises minimizing an energy that penalizes non-rigidness of the deforming;
- the minimizing of the energy comprises applying a global optimization algorithm;
- the trajectory comprises a list of points, the points including for each horizon marker a respective horizon marker point, the geological unit log associating each point to a respective geological unit, and the minimizing of the energy is performed under equality constraints representing match between each horizon marker point and a position of the geomodel consistent with the respective horizon marker of the horizon marker point, and under inequality constraints representing belonging of each point to a zone of the geomodel consistent with the respective geological unit of the point;

the trajectory comprises a list of points and segments each linking two consecutive points, the points including for each horizon marker a respective horizon marker point and for each fault marker a respective fault marker point, the geological unit log associating each point to a respective geological unit, the method comprises computing a positive-definite matrix representing the trajectory as a graph, the matrix representing a discontinuity at each fault marker point, and the energy is expressed as a function of the matrix and of a vector representing application of the displacement to the points;

the matrix is a sparse matrix;

the matrix is a Laplacian matrix;

the function expressing the energy is a quadratic function of the vector, for example of the type $1/2d^T Ld$, where d is the application of the displacement to the points, and L is the matrix;

the minimizing of the energy comprises applying a global optimization algorithm, the minimizing of the energy is performed under a constraint of equality between each horizon marker point and a position of the geomodel consistent with the respective horizon marker of the horizon marker point, and under a constraint of inequality representing belonging of each point to a zone of the geomodel consistent with the respective geological unit of the point, and the global optimization algorithm is an active set algorithm;

the at least one well comprises several wells defined by a user, the deforming being performed fully automatically on each of the several wells;

the method further comprises transferring, after the deforming and to the trajectory of the at least one well as deformed, at least part of the data distributed along the trajectory and provided for the at least one well before the deforming; and/or the method further comprises, after the deforming, performing a hydrocarbon flow simulation based on the geomodel and on the trajectory of the at least one well as deformed.

It is further provided a computer program comprising instructions for performing the method.

It is further provided a data storage medium having recorded thereon the computer program.

It is further provided a system comprising a processor coupled to a memory, the memory having recorded thereon the computer program. The system may further comprise a display configured for displaying outputs of the method and/or a graphical user interface for entering inputs of the method.

It is further provided a hydrocarbon production process which comprises performing one or more iterations of the method. The process also comprises producing hydrocarbon based on the one or more iterations.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
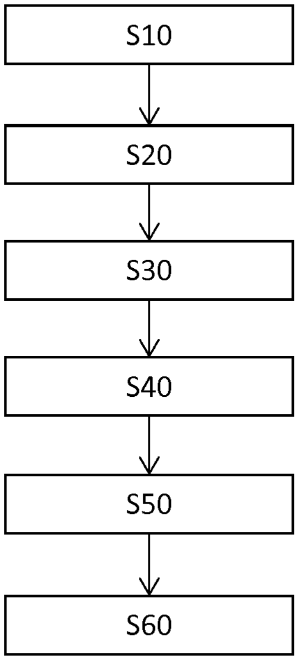
FIG. 1 shows a flowchart of an example of the method.

FIG. 1 shows a flowchart of an example of the method.

The method of the example comprises providing S10 a geomodel. The geomodel is configured for hydrocarbon flow simulation in a petroleum reservoir. The reservoir has one or more wells. The geomodel represents horizons and geological units of the reservoir. The method also comprises providing S20 respective data for each well. The respective data comprise a trajectory representing the path of the well in the reservoir. The data further comprise data distributed along the trajectory. The data distributed along the trajectory include horizon markers, one or more fault markers, and a geological unit log. The method further comprises deforming S30 the trajectory of at least one well based on the geomodel. The deforming is constrained by consistency of the horizon markers and of the geological unit log with the geomodel. A discontinuity is allowed at each fault marker.

This provides an improved solution for obtaining consistency between the geomodel and the trajectory of the at least one well. The method thus outputs an accurate geomodel representation of a petroleum reservoir having one or more wells. Such output allows an accurate hydrocarbon flow simulation.

Notably, the method relies not only on horizon markers but also on a geological unit log provided at S20 in order to deform at S30 the trajectory and establish consistency of these data with the geomodel. Relying on both these types of data (e.g. rather than only one type) improves accuracy and robustness of the result.

In addition, the method takes the approach of deforming at S30 the trajectory of the at least one well (rather than deforming the geomodel). In other words, the method relocates the well in the geomodel. This makes the method efficient in terms of computation time, as the trajectory involves less data than the geomodel (since it is smaller, and also linear—rather than three-dimensional), and as deforming the geomodel would require checking conformity of the result with more prior constraints (since the geomodel would need to continue representing geological structures accurately after the deformation). This also makes the method robust, as situations where the geomodel does not contain details are also handled accurately.

Moreover, it has been observed that in some cases uncertainties related to well trajectories are stronger than uncertainties related to the geomodel, despite assumptions of prior art methods that deform the geomodel. This is particularly true for wells which are not (only) generally vertical, such as wells which are majorly horizontal (deviated wells). Thus, deforming well trajectories at S30 rather than the geomodel modifies data where the uncertainty lies and maintains data for which the level of certainty is rather high, thus resulting in higher accuracy. In examples, the at least one well comprises one or more non-vertical portions (i.e. portions each of a length higher than 50 meters and along which the average of the angle between the path of the at least one well and the vertical direction is superior to 10°).

Furthermore, the method relies on an additional type of data distributed along the trajectory of the at least one well: the one or more fault markers. In specific, the deforming S30 is allowed to result, for each fault marker, in a respective discontinuity of the deformed trajectory. This freedom provided to the deforming S30 allows the method to robustly fulfill the constraint of consistency of the horizon markers and of the geological unit log with the geomodel. Also, this freedom to introduce discontinuities is provided at relevant locations of the well trajectory: at fault marker locations. These locations correspond to an encounter between the well and a fault (which is not necessarily represented in the geological model, due to the fact that faults are sometimes not represented in the geomodel for example because they are sub-seismic (fault size is less than the seismic resolution) and thereby invisible at the time of seismic interpretation, but only visible at the well), with thereby an effective discontinuity in the geomodel. Thus, the release of the continuity condition does not result in a loss of accuracy.

The method is a computer-implemented method for processing numerical data that represent real objects and/or physical quantities. Although physical actions may be performed in a hydrocarbon production process which comprises performing one or more iterations of the method, the following mainly discusses computer-implemented steps, and thus data processing step. In particular, providing data at S10 and S20 means that said data are instantiated on memory of a computer system performing the processing. The instantiation may result from a retrieval from a data storage, from a reception from a distant computer system, and/or from user-input. Also, the deforming at S30 of the trajectory designates a modification of the data provided at S20 so as to provide a modified representation of the path, while said path is actually left untouched in the subsoil (if the well is drilled). In other words, the deforming S30 designates a data processing operation, not a physical modification of a real well path.

The geomodel provided at S10 is now discussed.

A geomodel is a 3D representation of a geological environment that allows simulations related to the geological environment. A geomodel provides a 3D spatial representation of different geological structures of the geological environment, which allows the simulations.

In the case of the method, the geological environment is a petroleum reservoir having one or more wells. A petroleum reservoir is any subsoil containing hydrocarbons, e.g. including oil and/or gas, at least in part(s) thereof. The one or more wells may comprise one or more production wells (i.e. wells configured for extracting hydrocarbon from the subsoil to the surface) and/or one or more injections wells (i.e. wells configured for injecting fluids in the subsoil from the surface, e.g. in order to enhance production). The at least one well of which trajectory is deformed at S30 may accordingly comprise one or more production wells and/or one or more injections wells.

The reservoir may present lateral dimensions higher than 1 kilometer by 1 kilometer and/or lower than 100 kilometers by 100 kilometers, for example of the order of 10 kilometers by 10 kilometers, and/or a thickness higher than 10 meters and/or lower than 1 kilometer, for example of the order of 100 meters.

The reservoir comprises geological structures. A geological structure is a formation in the geological environment that is of interest to any geological phenomenon that may occur in the geological environment. Any geological structure contemplated by the method may be a horizon, a geological unit, an unconformity, an intrusion, a channel, a salt diapirism, a fold, a fault or yet a zone of steam presence or a front surface thereof in a steam-assisted gravity drainage (SAGD) situation.

The geomodel may optionally comprise or be adapted to determine a geological simulation grid. The geological simulation grid is any data structure that comprises a geometrical grid and that is configured for one or more hydrocarbon flow simulations contemplated to be performed with respect to the geological environment. The geological simulation grid may optionally also comprise parameters assigned to geometrical structures of the geometrical grid and that represent geological properties. The geometrical grid and its possibly assigned parameters are adapted to be inputted to one or more hydrocarbon flow simulators, which may in any known way perform flow simulations based upon the available data.

The geometrical grid is a data structure that represents the geological environment by a spatial distribution of geometrical cells. The geometrical grid and/or the geometrical cells may be of any dimension, for example three-dimensional. Each geometrical cell represents a respective real cell of the geological environment. All or a part of the geometrical cells of the geometrical grid may be of a cuboid or an at least substantially cuboid shape. One or more of the dimensions of all or a part of the geometrical cells may be superior to 1 meter, 2 meters, or 5 meters and/or inferior to 1000 meters, 500 meters, or 200 meters. The geometrical cells may for example be of a cuboid shape, and/or of dimensions of the order of 80 meters×80 meters×10 meters (e.g. ±50%, 25% or 10% for each dimension). The geometrical grid may comprise more than 10 000, 100 000 or yet 1 000 000 geometrical cells. All, substantially all, or at least a majority of the cuboid cells may be positioned horizontally or at least substantially horizontally. The geometrical grid may be regular or irregular, and/or structured or unstructured.

The geometrical grid may optionally conform to a reference set of geological structures of the geological environment (the reference set being for example any set comprising geological structures of interest to contemplated one or more flow simulations, that is, geological structures corresponding to the one or more flow simulations). This means as known per se that the gridding is constrained by the reference set of geological structures, such that for each given geological structure of the set, a corresponding geometrical structure of the geometrical grid conforms to the given geological structure. Optionally, such geometrical structures may be marked accordingly, that is to convey such correspondence information.

A geometrical structure of the geometrical grid is any one or any combination of one or more cells, one or more faces, one or more edges, and/or one or more vertices. A geometrical structure conforms to a given geological structure when the geometrical structure matches at least substantially the given geological structure. A given geometrical structure matches at least substantially a given geological structure when the spatial discrepancy between the given geometrical structure and the given geological structure is inferior or equal to a predetermined threshold.

The geomodel notably represents horizons and geological units of the reservoir. The geometrical grid may for example conform to these horizons. In other words, for each such horizon, a surface of the geometrical grid comprised of cell faces may represent the horizon (e.g. and be marked as such). The geometrical grid may for example further conform to the geological units. In other words, for each such geological unit, a set of cells of the geometrical grid may represent the geological unit (e.g. and be marked as such). A geological unit may be defined between two horizons. In such a case, the geometrical grid may conform to the two horizons via each time a surface comprised of cell faces, and to the geological unit via cells comprised between the two surfaces. Alternatively or additionally to geological simulation grids having geometrical grids, the geomodel may comprise any other geometrical representation of horizons and geological units of the reservoir, such as a representation via surfaces. A geological simulation grid may be determined based on said other geometrical representation.

In examples, the geological simulation grid may be configured for finite volume hydrocarbon flow simulation, and optionally one or more (e.g. each) flow simulation performed by the method may be a finite volume hydrocarbon flow simulation. As known per se, finite volume flow simulation is a specific type of flow simulation which takes as input a geological simulation grid including a geometrical grid having cells, and which comprises an iterative calculation to compute a discrete step by step evolution or cell properties from which flow may be derived, based on one or more parameters assigned (e.g. during the simulation or beforehand) to geometrical structures of the geometrical grid. At each time step of the simulation, properties are uniform within each cell of the model, such that finite volume simulation does not necessitate and excludes discretization of cells during the iterative calculation. In particular, during finite volume simulation, the geometrical grid of the geological simulation grid may remain constant (i.e. geometry of the cells is not modified). As a result, finite volume simulation performs relatively fast (for example compared to other numeric schemes such as finite element algorithms). Also, the results between different simulations are easily comparable since they pertain to the same meshing of the environment (the geometry of the cells being unmodified).

The geological simulation grid may thus in examples form a numerical reservoir simulation model which is a discretized model of a reservoir containing oil, gas, water or any combination, subdivided into cells. Each of the cells represents a corresponding volume of the reservoir. Cells are either connected or disconnected to other cells, geometric neighbors or not, so that fluid may flow from cell to cell. The fluids and rocks descriptions and distributions may be included in the model in the form of cell properties or look up tables. The simulation process is a computerized iterative calculation that takes injected volumes and constraints in producers/injectors bottom hole pressures to compute a discrete step by step evolution of pressure and saturations in each cell of the model. The time step may correspond to the time required to fill the smallest cell.

The simulation may output the following data:

the average field pressure as a function of time;

the total field cumulative oil, water and gas production profiles with time;

the total field daily (weekly, monthly, annual) production rates of each phase: oil, water and gas;

the individual well pressures (bottom hole or, through lift curves, wellhead) over time;

the individual well cumulative and daily flowrates of oil, water and gas with time;

either full field or individual well watercuts, GORs, O/W ratios with time;

and/or the spatial distribution of oil, water and gas saturations throughout the reservoir as functions of time i.e. So(x, y,z;t), Sw(x,y,z;t) and Sg(x,y,z;t).

At every step, first the gradient of the pressure may be estimated from the current pressure values in the cells. The gradient of pressure may then be used to decide how much fluid flows from each cell to each of its connected cells. Finally, fluid saturations may be updated and pressure may be recomputed from the new configuration.

In examples, the geometrical grid may be provided with an initial set of parameters each assigned to a respective geometrical structure of the geometrical grid. The initial set of parameters may represent geological properties of the reference set of geological structures to which the geometrical grid conforms, and/or more generally any local property of the geological environment. Each parameter is a value of a respective property of a respective geological structure. For example, porosity, permeability, density and/or facies, net-to-gross values may be assigned to cells. Transmissibility values may be assigned to cell pairs.

A transmissibility multiplier is a parameter which impacts how fluid flows from one cell of the pair to the other cell of the pair. As known per se, finite volume hydrocarbon flow simulation may be performed on grids with such parameters assigned to cell pairs. Transmissibility values allow to represent geological phenomena in the flow simulation, for example due to the presence of specific geological structures.

The providing S20 is now discussed.

The one or more wells of the reservoir may comprise one or more drilled wells and/or one or more drillable wells. Drilled wells are already drilled and thus materially realized in the reservoir, such that drilled wells each have a real path in the reservoir. Drillable wells are not drilled yet, but potentially to be later drilled, such that drillable wells have an expected/foreseen/designed path in the reservoir.

In both cases, the data provided at S20 comprise, for each considered well, a trajectory representing the path of the well in the reservoir (i.e. numerical data representing location of the path in any manner). In the case of a drilled well, the trajectory may be determined from measurements performed by one or more gyroscopes and/or one or more accelerometers used during the drilling of the well. In the case of a drillable well, the trajectory may be determined by user-input and/or by performing computations (e.g. simulations) that output an optimal trajectory (e.g. with respect to any criterion).

In both cases, the data provided at S20 further comprise, for each considered well, data distributed along the trajectory (i.e. numerical data representing a piece of information each associated to respective position of the trajectory). The data distributed along the trajectory include horizon markers, one or more fault markers, and a geological unit log. A horizon marker is a piece of information that marks a given position of the trajectory as corresponding to a particular horizon of the geological environment. A fault marker is a piece of information that marks a given position of the trajectory as being cut by a fault of the geological environment (note that the method may alternatively run with zero fault marker, in which case no discontinuity is allowed at the deforming S30). A geological unit log is information that allow associating locations of the trajectory each to a particular geological unit of the geological environment.

Each trajectory provided at S20 is linear and the horizon and fault markers provided therefore are consecutive, two consecutive markers defining a section of the trajectory. Each section may be continuous. The geological unit log may be provided at S20 by associating to each such continuous section a respective geological unit. The data provided at S20 must be coherent, meaning that the arrangement of horizons markers, fault marker(s), and geological unit log data must be consistent with the geological layering of the reservoir.

In the case of a drilled well, such data distributed along the trajectory may be determined from measurements performed within the well and/or from a geological analysis of seismic data acquired on the geological environment. The horizon markers may for example be determined from a gamma ray log, a resistivity log, a density log, a neutron log and/or a caliper log, each obtained via respective measurements performed with one or more adapted sensors. The fault markers may for example each be determined (e.g. and user-input) based on measurements performed within the well (e.g. a gamma ray log, a resistivity log, a density log, a neutron log and/or a caliper log, each obtained via respective measurements performed with one or more adapted sensors) and/or from an analysis of the seismic data or core analysis. The measurements and/or the analysis may reveal a fault in the subsoil at a corresponding position of the trajectory, for example via a sudden change of petrophysical characteristics which is not consistent with the sedimentary deposit sequence, or via apparition along the well of a visible damage zone. The geological unit log may for example be determined (e.g. and user-input) based on an analysis of the horizon markers and of the seismic data (e.g. that allow identification of horizons and related geological units) and/or from the petrophysical measurements along the log (the measurements allowing to understand in which geological unit one is located, e.g. sand, clay, or carbonate).

In the case of a drillable well, such data distributed along the trajectory may be determined by user-input, for example based on a geological analysis of seismic data acquired on the geological environment. The fault markers may for example each be determined (e.g. and user-inputted) based on an analysis of the seismic data (e.g. that reveal a fault in the subsoil at a corresponding position of the trajectory). The horizon markers and the geological unit log may for example be determined from an analysis of seismic data, analog measured data on nearby drilled wells, and/or geological considerations such as the continuity of the geological strata.

In all cases, the method may comprise, prior to S20, any such determination of the data to be provided at S20.

The deforming S30 is now discussed.

The method is described for the case where the horizon markers and the geological unit log are initially inconsistent with the geomodel. This is the general case, since the design of the geomodel provided at S10 and the determining of the data provided at S20 are generally performed independently.

In such a case, the deforming S30 comprises transforming the initial trajectory of at least one well provided at S20 into a new trajectory which achieves consistency. Indeed, the deforming S30 is constrained by consistency of the horizon markers and of the geological unit log with the geomodel. This means that the deforming S30 is forced to output a result where, in the new (deformed) trajectory, each horizon marker is at a location of the geomodel which represents the particular horizon corresponding to the horizon marker (e.g. a cell face representing said horizon in the geometrical grid). This also means that the deforming S30 is forced to output a result where, in the new (deformed) trajectory, each location of the trajectory associated by the geological unit log to a particular geological unit is at a location of the geomodel which represents the particular geological unit (e.g. in or on the set of cells representing said geological unit in the geometrical grid).

Now, the deforming S30 allows a discontinuity at each fault marker. The trajectory initially provided at S20 may be continuous. The deforming S30 is free to break continuity of the initial trajectory at position(s) marked by the fault marker(s) so as to potentially result in respective discontinuity(ies) in the new (deformed) trajectory. The deforming S30 may on the opposite be constrained to maintain continuity at other positions, which are not marked by a fault marker. This provides a release of the continuity constraint only where relevant, so as to more robustly fulfill the consistency constraint involving the horizon markers and the geological unit log.

As a result, the method provides after S30 an improved geomodel representation of the reservoir and of the path of the at least one well therein.

In examples, the at least one well may comprise several wells. In other examples, one or more (e.g. each) of the at least one well may additionally or alternatively be defined by a user. In other words, for each well whose trajectory is deformed at S30, the data provided at S20 are defined by the user. In such examples, the deforming S30 may be performed fully automatically on each well (i.e. each of the at least one well, e.g. each of the several wells). In examples, the method forms an ergonomic solution to correct inconsistency between well data and a geomodel, for instance to deform at once and fully automatically trajectory of several wells.

As shown on FIG. 1, the method may further comprise transferring S40, after the deforming S30, to the trajectory of the at least one well as deformed, at least part (e.g. all) of the data distributed along the trajectory (and provided at S20 for the at least one well before the deforming S30). In other words, the data distributed along the initial trajectory are maintained and thereby distributed along the deformed trajectory, according to the deformation S30 (i.e. data associated to a given location of the initial trajectory are then associated to the location of the new trajectory resulting from the deformation S30 of said given location).

Thanks to the method deforming the trajectory of the at least one well at S30 rather than computing a new trajectory independent from the initial trajectory, the method may keep track of where positions of the initial trajectory are displaced (i.e. their image in the new trajectory). Indeed, the deforming S30 may amount to apply a piecewise continuous displacement field to the initial trajectory. In other words, the deforming may apply, to each position of the initial trajectory, a set of displacement vectors continuously distributed along the initial trajectory, and the function mapping each position to the displacement vector applied thereto may be continuous piecewise. The discontinuity(ies) may correspond to the fault marker(s).

In examples, this may be achieved by the trajectory being represented by a list of points and segments (e.g. straight segments) each linking two consecutive points, so as to form a segmented curve (e.g. polyline) which may initially be continuous at S20. The trajectory may be provided as such at S20, or alternatively the trajectory provided at S20 may be discretized (in any manner, e.g. regularly or irregularly) to determine such a list of points. The method may then apply each of a corresponding list of displacement vectors (i.e. translations) to a respective one of the points. The topology of the initial polyline may be maintained, such that a segment linking two initial points is transformed into the segment linking the two transforms of said two initial points, with the exception that a discontinuity may be added for each fault marker.

As a result, the method provides after S40, accurately and in an efficient manner, an improved geomodel representation of the reservoir and not only of the path of the at least one well therein, but also of any data distributed along the trajectory which represents the path and which desired in the modified representation. This may include not only at least part (e.g. all) of the horizon markers, at least part (e.g. all) of the one or more fault markers, and/or at least part (e.g. all) of the geological unit log information, but this may also include other data distributed along the trajectory, such as measurements, completions, perforations and/or logs such as gamma ray, neutron, density, resistivity, caliper.

As shown on FIG. 1, the method may further comprise, after the deforming S30 and whether or not the method comprises a transferring S40, performing S50 a hydrocarbon flow simulation based on the geomodel and on the trajectory of the at least one well as deformed. Notably, the method may determine parameters of the simulation as a function of the trajectory, and optionally of one or more characteristics of the well (e.g. including size, diameter and/or operational flow rate parameters). The simulation S50 may then be executed with these parameters based on the geomodel. The deformed wells may impact the simulation by introducing sources or sinks to the fluid simulation. The cells touched by the deformed trajectories, in particular in the presence of perforations, may be connected to the wells and coupled to the physical properties of the wells, such as production and/or injection flows, borehole pressure, etc.

In case the method comprises a transferring S40, the hydrocarbon flow simulation S50 may be further based on the data transferred at S40 and thereby distributed along the trajectory as modified at S30. Notably, completions on a drilled well and/or measurements performed along a drilled well may be used to further configure the geomodel (in particular the geological simulation grid), for example by imposing corresponding constraints to the simulation such as incoming or outgoing fluid fluxes, and/or imposed pressure values.

The hydrocarbon flow simulation S50 may be any flow simulation as described earlier, for example a finite volume flow simulation.

Examples of the deforming S30 are now discussed.

In examples, the method rewards rigidness of the deforming S30. In other words, given the constraint of consistency of the horizon markers and of the geological unit log with the geomodel, the method exploits the freedom conferred by authorizing a discontinuity at each fault marker to penalize an extent of non-rigidness of the final deformation. As a result, the method tends to output rigid deformations. This allows to stay close to the initial geometry of the trajectory. Said initial geometry comprises uncertainty but it may have been designed to be physically realistic/feasible. By rewarding rigidness, the method maintains this characteristic when it corrects the uncertainty. This may be performed in any manner.

For example, the deforming S30 may comprise applying, to positions of the trajectory, a displacement restricted to a same direction. In other words, the deforming S30 comprises moving positions of the trajectory all in the same direction (thus all along respective lines parallel one relative to another). This simplifies the constrained problem solved at S30 and thereby facilitates convergence toward a solution, thus increasing robustness of the deforming S30. Furthermore, this provides rigidness of the deformation.

In particular, the horizons are generally parallel one relative to another, and thereby orthogonal to a same direction. In such a case, such direction orthogonal to the horizons may be the displacement direction (used for restricting the displacement). This globally minimizes required displacements to fulfill the constraint, because the uncertainty is, due to geological reasons, often the highest in the displacement direction, in particular for the non-vertical portions of the well. Thus, this preserves the initial shape of the trajectory compatibly with its uncertainty. This also exploits the fact that faults are often substantially directed orthogonally to the horizons (or at least modulo an approximation, such approximation being reasonable over the relatively small thickness of the geological layer at stake). The discontinuity allowed at each fault marker will thus be created by the method at S30 by a displacement substantially along the fault, such that the trajectory will still meet the fault on both sides. In case the meeting is not perfect, due to the fault being not exactly orthogonal to the horizon, the deforming S30 may comprise a projection on the fault after the displacement (referred to as “second translation” hereunder).

In specific, the horizons often extend substantially horizontally. In such a case the displacement direction may be the vertical direction. In all cases, the method may comprise a prior step of rotating all geometrical data (provided at S10 and S20) such that the horizons are horizontal on average in an (x,y,z) referential frame. In such a case, the displacement direction may be the vertical direction z.

In the case of a trajectory represented by a list of points such as a polyline, the deforming S30 may comprise translating points (e.g. of the polyline) all in said same direction. In examples, the deforming S30 may after said translation perform no other displacement of any point of the polyline. In other examples, the deforming may further comprise a second translation of points in another direction (e.g. orthogonal to the first translation direction), but within a predetermined threshold (e.g. said threshold forbidding lateral translation beyond a next point on the polyline), for example to project points associated to fault markers on a fault surface. In such other examples, the deforming S30 may after said second translation perform no other displacement of any point of the polyline.

In such examples of a displacement restricted in a same direction (e.g. orthogonal to the horizons and/or vertical), the deforming S30 may comprise minimizing an energy which penalizes non-rigidness of the deforming. In other words, the method solves an optimization program which, under the constraint of consistency of the horizon markers and of the geological unit log with the geomodel, integrates freedom to introduce a discontinuity at each fault marker and tends to reach an optimal solution which comprises a displacement of positions orthogonal to the horizons, and such that the shape of the initial trajectory is modified as little as possible. The free variable of the optimization program is the restricted displacement (e.g. restricted to the vertical direction), and the optimum of the program is thus the value of said displacement that minimizes the energy. The deforming S30 may optionally comprise post-processing after the minimization, such as the projection mentioned earlier.

In examples, the minimizing of the energy comprises applying a global optimization algorithm. In other words, rather than applying a greedy process, the method finds a global optimum of the optimization program, thereby ensuring robustness and accuracy of the result.

Examples of the deforming S30 are now discussed with a displacement restricted in a vertical direction, where further the trajectory provided at S20 comprises a list of points or where said trajectory is discretized (in any manner) into a list of points before S30. In these examples, the points include for each horizon marker a respective horizon marker point. The points may also include for each fault marker a respective fault marker point. The geological unit log associates each point of the list to a respective geological unit, be it a horizon/fault marker point or not (with the specificity for a horizon marker point that the point is associated to a horizon, which delimits two geological units).

In these examples, the minimizing of the energy may be performed under equality constraints and inequality constraints (so-called “box constraints”). This allows an efficient solving of the optimization program. Equality and inequality constraints are indeed integrable to an optimization program relatively simply, for example by adding corresponding Lagrange multipliers to the energy.

The equality constraints represent match between each horizon marker point and a position of the geomodel consistent with the respective horizon marker of the horizon marker point. In other words, the equality constraints force the horizon marker point to be located on the corresponding horizon after the deforming S30. Since the displacement of the horizon marker point is vertical, this amounts to imposing a constraint of the type $z=z_{horizon}$ where z is the height (or depth) of the horizon marker point and is a free variable of the minimization, and $z_{horizon}$ is fixed and is the height of the corresponding horizon in the geomodel on the vertical line containing the horizon marker point.

The inequality constraints represent belonging of each point to a zone of the geomodel consistent with the respective geological unit of the point. In other words, the inequality constraints force each point to be located in the associated geological unit after the deforming S30. Since the displacement of the horizon marker point is vertical, this amounts to imposing constraints of the type $z_{base} \leq z$ and $z \leq z_{roof}$ where z is the height (or depth) of the point and is a free variable of the minimization, and $z_{base}$ and $z_{roof}$ are fixed and are the heights of the base and roof of the corresponding geological unit in the geomodel on the vertical line containing the point.

Such scalar equality and inequality constraints are very easy to integrate to the optimization, for example via Lagrange multipliers. These are allowed by the simplification of the problem to a vertical displacement.

Alternatively or additionally, in these examples (e.g. and where the trajectory provided at S20 may further comprise the earlier-mentioned segments each linking two consecutive points so as to form a polyline), the method may comprise computing a positive-definite matrix representing the trajectory as a graph (with nodes corresponding to points of the list and edges corresponding to segments), such as Laplacian matrix. The energy may then be expressed as a (e.g. quadratic) function of the matrix and of a vector representing application of the displacement to the points. The positive-definiteness of the matrix allows a fast and robust resolution. The matrix may be sparse (such as is the case with the Laplacian matrix). This allows an even faster resolution. The quadratic nature of the function allows a particularly efficient resolution, for example with an active set algorithm when combined with box constraints.

In such a case, the matrix represents a discontinuity at each fault marker point. The computing may for example comprise duplicating the fault marker point, and having no segment and thus no edge representation between the duplicates in the matrix.

As shown on FIG. 1, the method may be integrated in a hydrocarbon production process which comprises producing S60 hydrocarbon based on a result of the simulation S50.

One or more iterations of the method may be integrated in the hydrocarbon production process. The process may comprise performing one or more physical actions on the geological environment based on a result of the one or more iterations of the method. The one or more physical actions may comprise extracting hydrocarbon and/or injecting fluid in the subsoil to enhance extraction, fracking, performing (e.g. seismic, logs) measurements, and/or drilling and/or operating one or more (e.g. production and/or injections) wells.

Notably, one or more (e.g. all) iterations may include each one or more hydrocarbon flow simulations. In such a case, the one or more physical actions may be based on one or more results of one or more such flow simulations. The process may for example comprise setting a value of one or more production parameters as a function of said one or more results, and then performing the one or more physical actions based on said one or more production parameter values, and at least eventually extracting hydrocarbon based on said one or more actions.

In examples, the one or more productions parameters may comprise a parameter consisting of well location information, a value of the parameter corresponding to information relative to location one or more production wells and/or one or more injections wells. In such a case, the extracting may comprise drilling new wells and/or operating already-drilled wells according to said well location information. Additionally or alternatively, the one or more productions parameters may comprise a parameter consisting of well operation information, a value of the parameter corresponding to information relative to operation of one or more production wells and/or one or more injections wells. In such a case, the extracting may comprise operating wells according to said well operation information.

In additional or alternative examples, the one or more production parameters may comprise a fracking location parameter, a fracking type parameter, a seismic measurement location parameter, and/or a seismic type parameter.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 2:
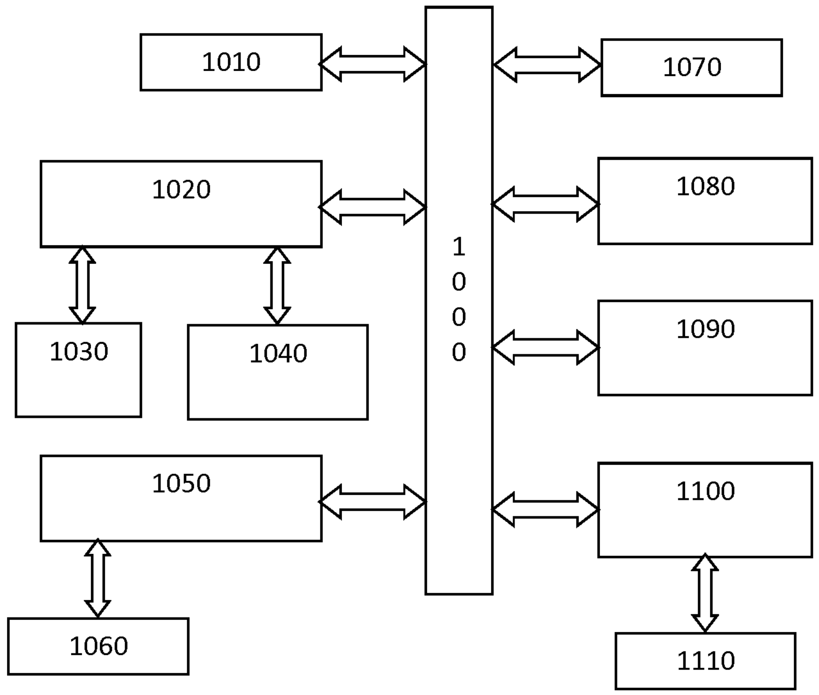
FIG. 2 shows an example of the system.

FIG. 2 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

An example of the method integrating all features discussed above with respect to S10-S30 is now discussed.

The example method allows to automatically and rapidly deform trajectories of a set of wells while respecting lithological constraints described through:

A) Horizon markers (geological limits interpreted on a well), associated with seismic horizons (same geological limits interpreted on seismic). The example method guarantees a perfect superposition after deformation.

B) Fault markers (geometric discontinuity identified on well imaging logs), at which the trajectory is cut off. These fault planes are often undetectable by seismic analysis. The method introduces a discontinuity in the trajectory making it possible to better respect criteria A and C.

C) A log of geological units (which describes the intervals traversed along the trajectory), which imposes on a certain number of points of the trajectory to belong to a given unit.

as well as geometric constraints:

D) Limit deformation to vertical displacement.

E) Preserve the original shape of the well at best (the trajectories before and after deformation have similar curvatures, guaranteed by the most rigid deformation possible), given the lithological and geometric constraints already described.

The example method allows to transfer any element attached to the initial trajectory, such as measurements (e.g. logs and/or markers) and drilling architectures (e.g. completions), on the deformed trajectory.

The example method provides consistency of the well markers with the horizons (equality constraint A), and it further guarantees that the intermediate points remain in the correct geological units (constraint C). The example method thereby reduces probability of a portion of a well to be located in an incorrect geological unit, and thus of such a situation greatly distorting the result of a flow simulation, with implications for oil assessment and even risk.

The example method also takes into account faults (constraint B). The example method reduces probability to generate continuous deformed trajectories, and thus of non-respect of the constraint of belonging to a given geological unit (constraint C) when the fault makes two different units face one another.

Finally, the example method solves a global optimization problem, rather than proceed iteratively by deforming successive portions of the well to wedge it to the data. The method thus avoids heuristic rules to decide for example where the trajectory must start in the case of the crossing of a fault, which is specific to methods of the type called "greedy" (where the choices made at the beginning of the calculation of the deformation are never questioned). The example method thereby reduces probability to accumulate errors and to arrive at a non-optimal solution, or not consistent with the constraints. Compared to some greedy methods allowing to modify initial choices, the example method performs faster as it does not need to run the different iterations required for modifying the choices. Also, the example method in general performs fast as it does not require user-intervention.

The example method comprises the following:

a) The horizons/faults system and the wells are rotated to make horizons as horizontal as possible. This is done to render the vertical deformation approximation as accurate as possible.

b) Well trajectories are represented as a sequence of points connected by segments.

c) For each well, a constrained linear system is created as follows:

c.1) A sparse and positive-definite matrix, describing the shape of the well is calculated (for example, the Laplacian matrix).

c.2) For each horizon marker, the corresponding seismic horizon is determined. The point of the marker on the well is then defined as the starting point, and the point of the horizon located vertically above or below the marker point is retained as the point of arrival. An equality constraint is introduced to the system for each start point/end point pair.

c.3) For each fault marker, the shape matrix defined above is modified by removing the matrix elements that couple points on either side of the fault. This manipulation makes the different portions of trajectory independent, and releases their extremities which will be free to slide on the fault, constrained only by belonging to the right unit.

c.4) For each point in the log defining the geological unit, the seismic horizons "roof" and "base" of the unit are determined, and the "$z_{roof}$" and "$z_{base}$" depths of the two horizons, corresponding to the position of the point, are determined. Two inequality constraints, $z_{base} \leq z$ and $z \leq z_{roof}$, are added to the system.

d) The linear system built from the modified form matrix, equality and inequality constraints are solved. This may be performed particularly efficiently for example with an active set method. The active set method may as described in the paper by Voglis, C. and Lagaris, I. E., in 2004, entitled "*BOXCQP: An algorithm for bound constrained convex quadratic problems*", in Proceedings of the 1st International Conference: From Scientific Computing to Computational Engineering, IC-SCCE, Athens, Greece.

e) The values of the solution of the system represent the coordinates "z" of the points of the deformed trajectory of the well.

f) The values of the MD (Measured Depth=curvilinear abscissa) of the original trajectory are transformed on the deformed trajectory, and are used to transfer any element attached to the initial well trajectory (e.g. logs, markers, and/or completions) on the deformed version.

An example application of the example method is now discussed.

The example application is directed to comparing the production performance of two possible geological scenarios for reservoir geometry, but using the same set of injection-production wells to be drilled in the future. The two geomodels representing the two scenarios have the same geological units but with different geometries (e.g. depth, thickness). The hundreds of wells established in scenario 1 no longer perforate the good units in scenario 2, and it is not possible to simulate the flows. Since the wells are not yet drilled, we want to modify the trajectories of the wells in order to bring them into line with the second scenario. The example method can therefore be applied in this case, to create new well trajectories and ensure that they are at all points in the correct units, that they intersect the seismic horizons in the right places, and that they are discontinuous through the faults if needed. The set of constraints being minimal, the trajectory of each well will remain as close as possible to the original trajectory, thus minimizing the problems of shape difference and simplifying the transfer of any data from the original well to its deformed version.

The example method makes it possible to solve the problem in the more general case (constraints of crossing horizons, belonging to geological units and discontinuity on faults) by imposing a minimum set of constraints, and thus obtaining a trajectory as close as possible of the original trajectory. The simplification due to the fact that the deformation will be exclusively vertical makes it possible to ensure that the calculation succeeds in all cases (provided that the constraints are consistent). The problem may be formulated in the form of a global optimization, taking advantage of the best numerical methods present in the literature to guarantee an optimal result. Also, even if the curvilinear abscissa values change during deformation, a transfer of the well data is possible and even simple to carry out. Performance and convergence guarantees also make it possible to apply the method automatically to a very large number of wells without user intervention.

The proposed solution deforms the trajectories of well(s) allowing at the same time to:

- respect the constraints of timing of crossing of horizon with the markers;
- respect the membership of each point along the well to a geological unit given by a log on the well; and
- cut the trajectory along the faults and to choose automatically and optimally the placement of the trajectory on either side of the fault without any other user intervention.

The solution uses a vertical approximation of the problem which makes it possible to reformulate it in the form of a constrained global optimization, thus making it possible to exploit known numerical methods (quadratic convex, constrained and box-constrained programming) which have convergence guarantees, performance and optimality of the solution.

The result is that:

- obtaining a result that meets all the constraints is guaranteed when the constraints are coherent (for example, coherence between horizon markers and log of geological units); and
- the optimality of the obtained solution is guaranteed in the sense of the proximity with the original trajectory.

This last aspect makes it possible to limit the problems known as "dog leg" (that is to say, technical non-feasibility of the trajectory of wells) without faults, as well as to limit as much as possible the effects of deformation of the logs and completions on the calculated trajectory.

The low filling rate of the shape matrix (O(N)), as well as its positive-definiteness, combined with an effective method of solving the constrained problem (for example, "active set"), guarantee the convergence of the solution with very good performances.

The proposed solution allows to respect all the constraints, to stay close to the departure path (mathematically and provably guaranteed proximity) and to always converge towards an optimal solution with a reasonable calculation time. In addition, performance and convergence guarantees allow the method to be executed on a large number of wells automatically, another important advantage in the context of an operational study.

The simplicity and optimality of the method are based on the approximation of a purely vertical deformation. This makes the method specifically designed for vertical fault planes (or more precisely orthogonal to the sedimentary layers).

As the units are often very thin (compared to their size in map), with a ratio between scales close to 1:100, this constraint is not very limiting in practice. Faults with significant curvature (e.g. listric faults) are often located deep down, in areas that are of interest to oil exploration only occasionally. In any other case, the horizontal displacement of the fault plane within the same unit is very limited, and the trajectory obtained by the method can simply be projected horizontally on the fault plane at the end without causing too much change on the solution.

In a similar way, the seismic horizons are often very flat in the areas of interest, with vertical variations much less important than their horizontal extent. In this case, the rotation performed at the beginning of the method cancels the effect of their dip.

One can imagine a limit case in which the horizons are completely flat and parallel. In this simplified case, the minimization of the deformation of the well decouples the variables "z", "x" and "y". Since no other constraint plays in the two horizontal directions, the optimal solution will therefore simply be to preserve the original values of "x" and "y", thus obtaining a purely vertical deformation. This situation is geologically common.

Studies often face different geological scenarios. The reconciliation of the well data with the modifications made to the geomodel may therefore be a step before any simulation can be launched. In a faulty and complex context, with hundreds of wells, this step cannot be done by hand.

Stalling well trajectories represents a fundamental step and a potential blocking point before any reservoir simulation for some studies. Any delay or error in this step entails costs in human resources (geologists, geophysicists and reservoir engineer blocked, many necessary QC, etc.) and computer (underutilized computing machines and/or simulations not correct or incomplete). In addition, delays or errors in this step can lead to incorrect decisions in the exploitation of hydrocarbon resources, with associated costs (dry wells) and HSE risks (poor assessment of the risks of overpressure due to poor intake). wells in the simulation) or legal (non-compliance with commitment clauses due to delays, for example).

The use of the method makes it possible to quickly have well trajectories compatible with new reservoir simulations, a fundamental and blocking step for the good development of studies and potential source of delays and/or uncertainties.

An example implementation of the method is now discussed with reference to FIGS. 3-4.

The example implementation forms a simple "vertical well relocation" tool for matching wellbores to a geomodel.

The input data comprise:

A list of wells to be relocated;

An interval sequence which provides:

- the association between markers $M_i$ and horizons $H_i$;
- the top/bottom horizons for every geological unit $U_i$;

For each well:

- A unit log (same name for every wellbore) which is a discrete log and provides the index i (in interval sequence) of the unit containing each point;
- Horizon markers $PM_i$ which may be automatically retrieved; and A fault marker PF (same for every wellbore) giving the position of the fault F crossings along the wellbore.

Figure 3:
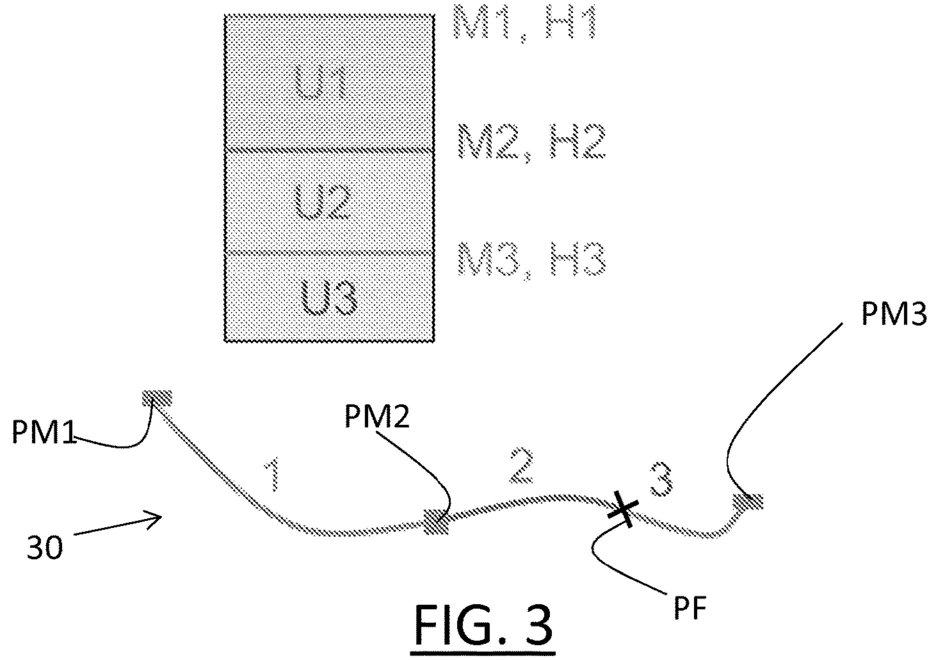
FIGS. 3-4 illustrate an example implementation of the method.

FIG. 3 shows such input data and the representation 30 of the data provided at S20 for one well having a trajectory PM1_PM2_PF_PM3 represented by a polyline (the points and segments of the polyline being not shown on the figure) where each point is either a horizon marker $PM_i$, the fault marker PF, or another point there between associated to a respective geological unit $U_i$ (represented by index I from 1 to 3 on the figure).

The example implementation allows to preserve the shape of the well. This is performed by providing the following energy to minimize:

$$E = \frac{1}{2} d^T L d$$

where d is the vertical displacement and L is the Laplacian matrix, based on the polyline. L represents discontinuities at faults, with disconnected points in the associated graph.

The example implementation further introduces marker constraints, by separating marker points PM; and free points PF and minimizing:

$$L = \frac{1}{2} d_f^T L_{ff} d_f + d_m^T L_{mf} d_f$$

under unit log constraints (i.e. displacements are bounded):

$$a_f \le d_f \le b_f$$

The matrix L is sparse and positive-definite.

This problem is known as a "box-constrained convex quadratic programming" problem.

Said box-constrained problem is generally formulated as:

$$E = \frac{1}{2} x^T Q x - k^T x,\ a_i \le x_i \le b_i$$

where

Q corresponds to $L_{ff}$;

$K^T$ corresponds to $-d^T_m L_{mf} d$; and x corresponds to $d_f$.

And it can be easily solved by adding Lagrange multipliers to the energy:

$$E = \frac{1}{2} x^T Q x - k^T x - \lambda^T (x-a) + \mu^T (x-b)$$

And satisfying the Karush-Kuhn-Tucker (KKT) conditions:

$$\begin{cases} Qx - k - \lambda + \mu & = & 0 \\ \lambda^T (x-a) & = & 0 \\ \mu^T (x-b) & = & 0 \\ a_i \le x_i \le b_i & \forall & i \\ \lambda_i \ge 0, \mu_i \ge 0 & \forall & i \end{cases}$$

The problem may be solved for example via an active set method as extensively described in the earlier-cited paper and which performs as follows:

a. Start with the unconstrained solution $x = Q^{-1} k$ b. If the solution satisfies the constraints, stop the algorithm c. For every i such that $x_i < a_i$ or $x_i = a_i$, $\lambda_i \ge 0$, set $x_i = a_i$, $\mu_i = 0$ d. For every i such that $x_i > b_i$ or $x_i = b_i$, $\mu_i \ge 0$, set $x_i = b_i$, $\lambda_i = 0$ e. After constraining the above $x_i$, solve for the remaining ones f. Determine the remaining multipliers via $\{\lambda_i, \mu_i\} = \pm (Q_{ij} x_j - k_i)$ g. Go to step b.

Figure 4:
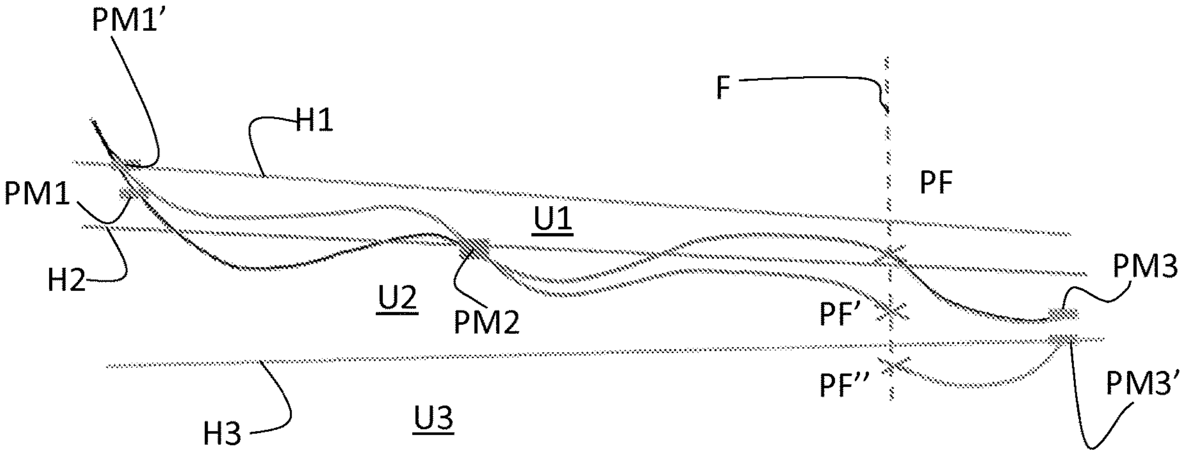

FIG. 4 shows the result. As can be seen, the initial trajectory PM1_PM2_PF_PM3 of the well was inconsistent with the geomodel. The example implementation deforms said trajectory, and the result PM1'_PM2_PF'_PF"_PM3' becomes consistent with the geomodel thanks to:

a vertical displacement of PM1 and PM3 into respectively PM1' and PM3' to arrive at horizons respectively H1 and H3 (PM2 was already consistent on horizon H2 and is thus not displaced);

replacement of PF by a discontinuity PF'_PF"; and a vertical displacement of PF', PF" (along fault F in this case) and all other points (not represented on the figure) to ensure that each section of the trajectory (with index i from 1 to 3 on FIG. 3) belongs to the correct geological unit $U_i$.

The invention claimed is:

1. A computer-implemented method comprising:

providing a geomodel configured for hydrocarbon flow simulation in a petroleum reservoir of a geological environment having one or more wells, the geomodel representing horizons and geological units of the reservoir, the horizons being orthogonal to a same direction;

providing for each well:

a trajectory representing a path of the well in the reservoir, data distributed along the trajectory and including:

horizon markers, one or more fault markers, and a geological unit log; and a list of points and segments of the trajectory, each segment linking two consecutive points, each point including: (i) for each horizon marker a respective horizon marker point and (ii) for each fault marker a respective fault marker point;

wherein the geological unit log associates each point to a respective geological unit;

computing a positive-definite matrix representing: the trajectory as a graph and a discontinuity at each fault marker point;

deforming the trajectory of at least one well based on the geomodel, the deforming being constrained by consistency of the horizon markers and of the geological unit log with the geomodel, a discontinuity being allowed at each fault marker, the deforming comprising: (i) applying a displacement, limited to the direction orthogonal to the horizons, to positions of the trajectory and (ii) minimizing an energy that penalizes non-rigidness of deforming, the energy being expressed as a function of the positive-definite matrix and of a vector representing application of the displacement to the points;

numerically simulating a hydrocarbon flow in the petroleum reservoir using the provided geomodel and the trajectory of the at least one well with the deformed trajectory; and performing one or more physical actions on the geological environment based on results of the numerically stimulating.

2. The method of claim 1, wherein the method rewards rigidness of the deforming.

3. The method of claim 1, wherein the direction is a vertical direction.

4. The method of claim 1, wherein the minimizing the energy comprises applying a global optimization algorithm.

5. The method of claim 1, wherein:

the minimizing the energy is performed under equality constraints representing match between each horizon marker point and a position of the geomodel consistent with the horizon marker of each respective horizon marker point, and under inequality constraints representing belonging of each point to a zone of the geomodel consistent with the respective geological unit of the point.

6. The method of claim 1, wherein the matrix is a sparse matrix.

7. The method of claim 1, wherein the matrix is a Laplacian matrix.

8. The method of claim 1 wherein the function is a quadratic function of the vector, of the type $1/2d^T Ld$, where:

d is the application of the displacement to the points, and

L is the matrix.

9. The method of claim 8, wherein:

the minimizing of the energy comprises applying a global optimization algorithm, the minimizing of the energy is performed under a constraint of equality between each horizon marker point and a position of the geomodel consistent with the horizon marker of each respective horizon marker point, and under a constraint of inequality representing belonging of each point to a zone of the geomodel consistent with the respective geological unit of the point, and the global optimization algorithm is an active set algorithm.

10. The method of claim 1, wherein the at least one well comprises several wells defined by a user, the deforming being performed fully automatically on each of the several wells.

11. The method of claim 1, wherein the method further comprises transferring to the trajectory of the at least one well as deformed, and after the deforming, at least part of the data distributed along the trajectory and provided for the at least one well before the deforming.

12. A non-transitory data storage medium having recorded thereon a computer program, the data storage medium comprising:

computer-implemented instructions for performing well trajectory deformation by:

providing a geomodel configured for hydrocarbon flow simulation in a petroleum reservoir of a geological environment having one or more wells, the geomodel representing horizons and geological units of the reservoir, the horizons being orthogonal to a same direction;

providing, for each well:

a trajectory representing a path of the well in the reservoir, data distributed along the trajectory and including:

horizon markers, one or more fault markers, and a geological unit log; and a list of points and segments of the trajectory, each segment linking two consecutive points, each point including: (i) for each horizon marker a respective horizon marker point and (ii) for each fault marker a respective fault marker point;

wherein the geological unit log associates each point to a respective geological unit;

computing a positive-definite matrix representing: the trajectory as a graph and a discontinuity at each fault marker point;

deforming the trajectory of at least one well based on the geomodel, the deforming being constrained by consistency of the horizon markers and of the geological unit log with the geomodel, a discontinuity being allowed at each fault marker, the deforming comprising: (i) applying a displacement, limited to the direction orthogonal to the horizons, to positions of the trajectory and (ii) minimizing an energy that penalizes non-rigidness of deforming, the energy being expressed as a function of the positive-definite matrix and of a vector representing application of the displacement to the points;

numerically simulating a hydrocarbon flow in the petroleum reservoir using the provided geomodel and the trajectory of the at least one well with the deformed trajectory; and performing one or more physical actions on the geological environment based on results of the numerically stimulating.

13. The data storage medium of claim 12, wherein the computer-implemented instructions reward rigidness of the deforming.

14. A system comprising: a processor coupled to a memory, the memory having recorded thereon a computer program comprising instructions which when executed by the processor perform:

providing a geomodel configured for hydrocarbon flow simulation in a petroleum reservoir of a geological environment having one or more wells, the geomodel representing horizons and geological units of the reservoir, the horizons being orthogonal to a same direction;

providing, for each well:

a trajectory representing a path of the well in the reservoir, data distributed along the trajectory and including:

horizon markers, one or more fault markers, and a geological unit log; and a list of points and segments of the trajectory, each segment linking two consecutive points, each point including: (i) for each horizon marker a respective horizon marker point and (ii) for each fault marker a respective fault marker point;

wherein the geological unit log associates each point to a respective geological unit, computing a positive-definite matrix representing: the trajectory as a graph and a discontinuity at each fault marker point;

deforming the trajectory of at least one well based on the geomodel, the deforming being constrained by consistency of the horizon markers and of the geological unit log with the geomodel, a discontinuity being allowed at each fault marker, the deforming comprising: (i) applying a displacement, limited to the direction orthogonal to the horizons, to positions of the trajectory and (ii) minimizing an energy that penalizes non-rigidness of deforming, the energy being expressed as a function of the positive-definite matrix and of a vector representing application of the displacement to the points;

numerically simulating a hydrocarbon flow in the petroleum reservoir using the provided geomodel and the trajectory of the at least one well with the deformed trajectory; and performing one or more physical actions on the geological environment based on results of the numerically stimulating.

15. The data storage medium of claim 12, wherein the direction is a vertical direction.

16. The system of claim 14, wherein the processor executing the instructions rewards rigidness of the deforming.

17. The system of claim 14, wherein the direction is a vertical direction.

18. The method of claim 1, wherein the trajectory and the data distributed along the trajectory are determined from measurements.

19. The method of claim 1, wherein the one or more physical actions comprises at least one of: extracting hydrocarbon, injection fluid in subsoil to enhance extraction, fracking performing measurements, drilling, operating one or more production wells, and operating one or more injection wells.

* * * * *